Sept. 17, 1940.  A. TAUB  2,214,942

FLEXIBLE MOUNTING FOR RECIPROCATING ENGINES

Filed Dec. 16, 1938  3 Sheets-Sheet 1

Inventor
Alex Taub
By
Blackmore, Spencer & Flint
Attorneys

Sept. 17, 1940.   A. TAUB   2,214,942
FLEXIBLE MOUNTING FOR RECIPROCATING ENGINES
Filed Dec. 16, 1938   3 Sheets-Sheet 2

Inventor
Alex Taub
By
Blackburn, Spencer & Hint
Attorneys

Patented Sept. 17, 1940

2,214,942

UNITED STATES PATENT OFFICE 2,214,942

FLEXIBLE MOUNTING FOR RECIPROCATING ENGINES

Alex Taub, Hendon, London, England, assignor to General Motors Corporation, Detroit, Mich., a corporation of Delaware Application December 16, 1938, Serial No. 246,052
In Great Britain January 7, 1938

7 Claims. (Cl. 248—7)

This invention relates to flexible mountings for reciprocating engines such as internal combustion engines, pumps, compressors and the like.

The object of the invention is to provide an improved flexible mounting which will accommodate the principal vibratory movements of the front end of the engine, with a minimum transmission of the power of such movements to the fixed support or frame.

The three principal vibratory movements of reciprocating engines of the above character are: first, an oscillation, due to torque reaction, about the principal axis which is a downwardly inclined axis passing from front to rear through the center of gravity of the engine unit; second, an oscillation about a vertical axis passing through the center of gravity of the engine unit; and third, a vertical oscillation of the front end of the engine unit.

A flexible mounting unit according to this invention will allow all three such vibratory movements to occur without, however, permitting them to assume excessive amplitudes, and for this purpose the unit comprises a block of rubber or like resilient material mounted between and attached to diagonally opposite angle plates, the block having a slot therein to allow limited relative movement between said plates.

The nature of the invention and the manner in which it can be carried into effect will be better appreciated from the following description of one form of the invention as applied to an internal combustion engine on a motor vehicle.

Figure 1:
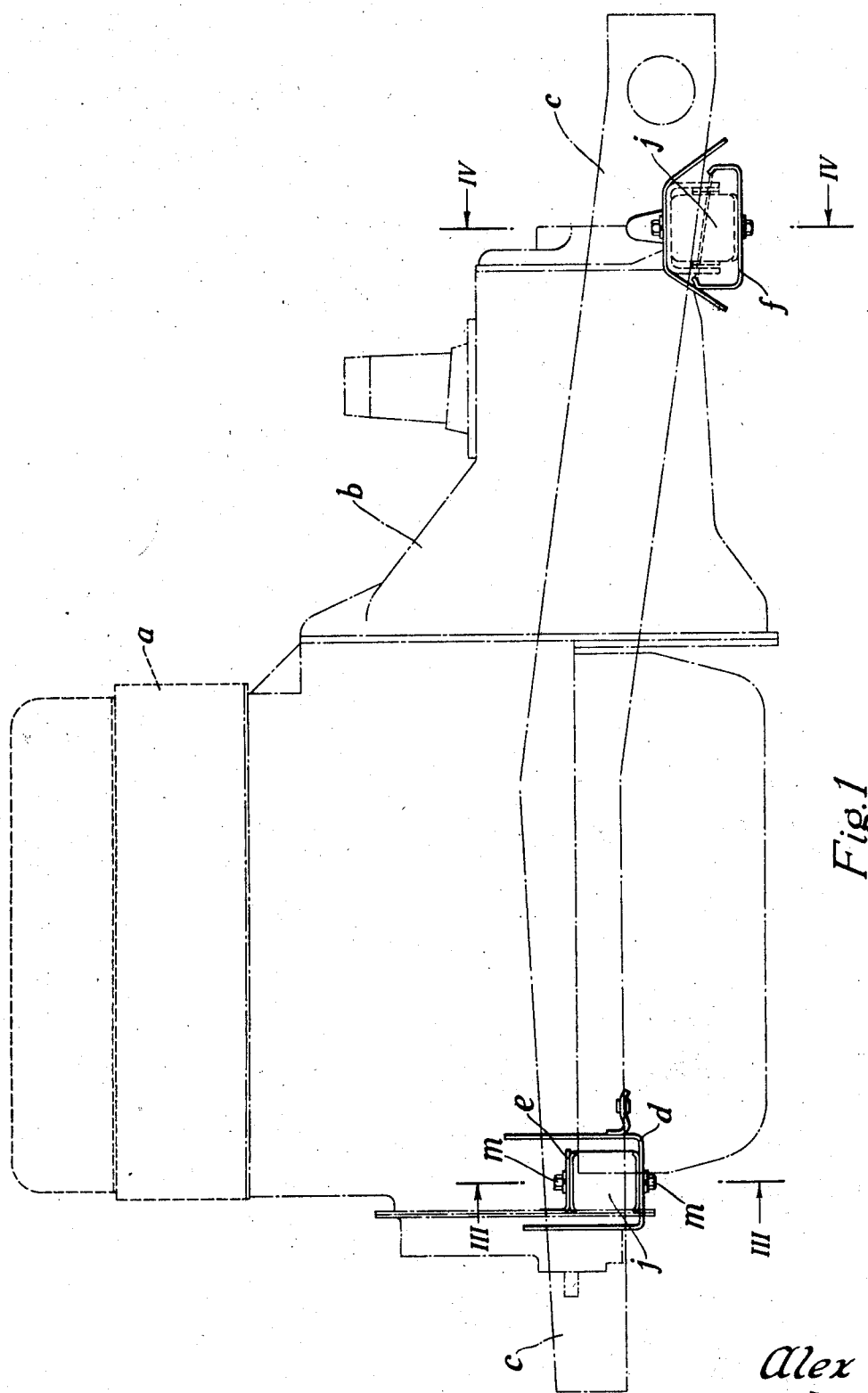
Figure 1 is a side view and Figure 2 a front view of an engine mounted according to this invention on the chassis of a motor vehicle.

In the drawings there is shown an engine $a$ forming with the clutch and gear-box housing $b$, a unitary structure mounted between the longitudinal side members $c$ of the motor vehicle chassis or composite body structure. The engine unit is mounted on these members by means of four mounting units according to this invention, two in front, and two behind.

Figure 2:
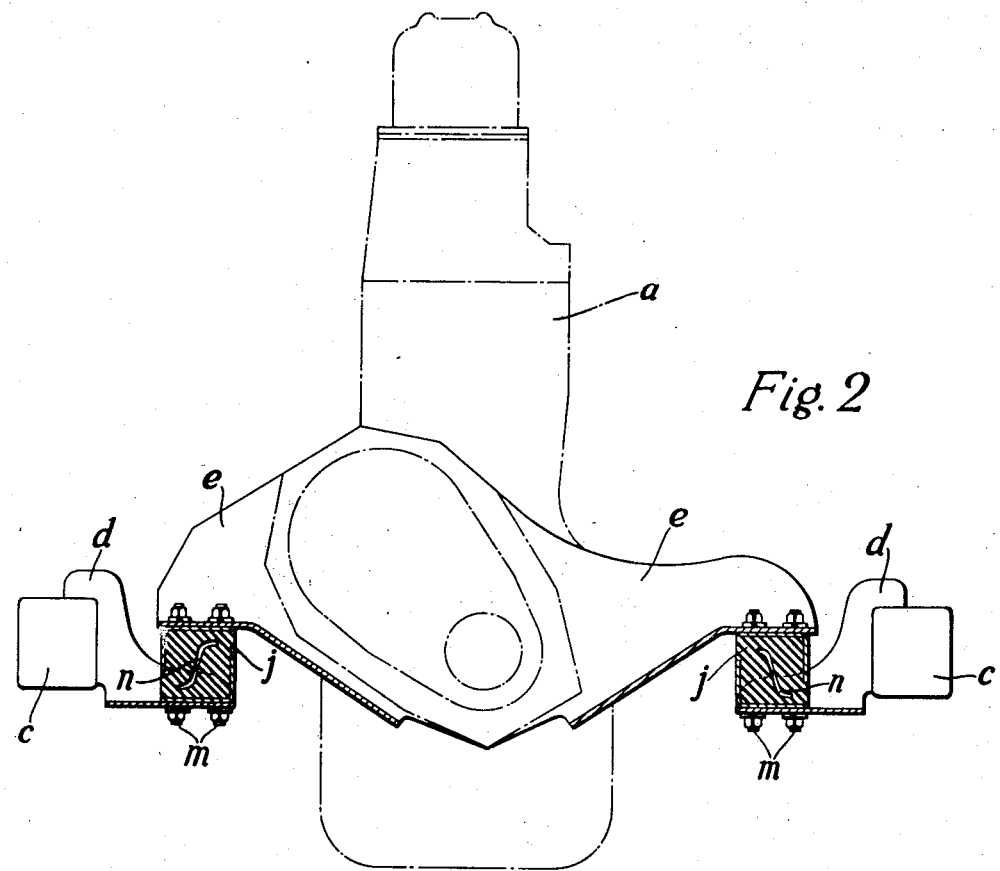
Figure 3:
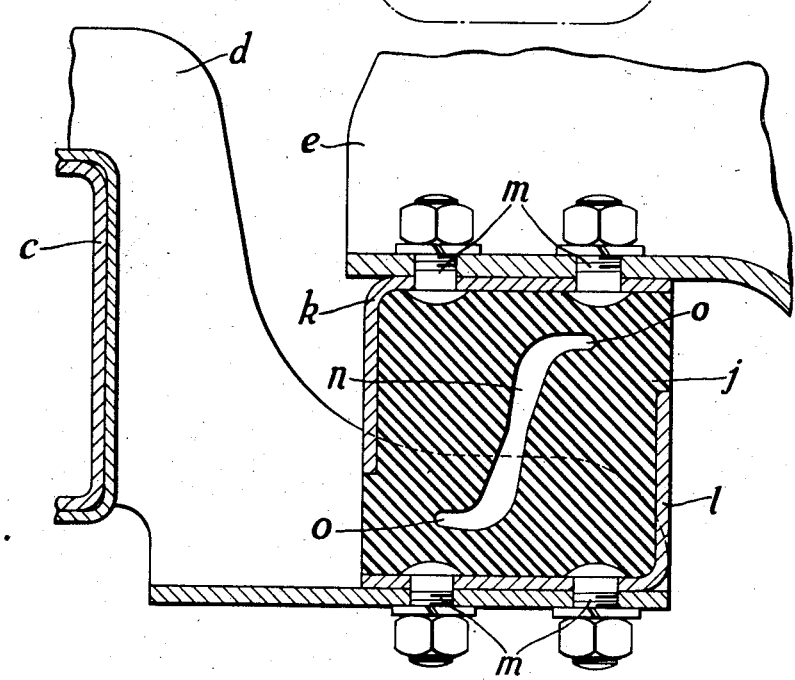
Figure 3 is a transverse section on an enlarged scale, on the line III—III of Figure 1, of one of the front units.
Figure 4:
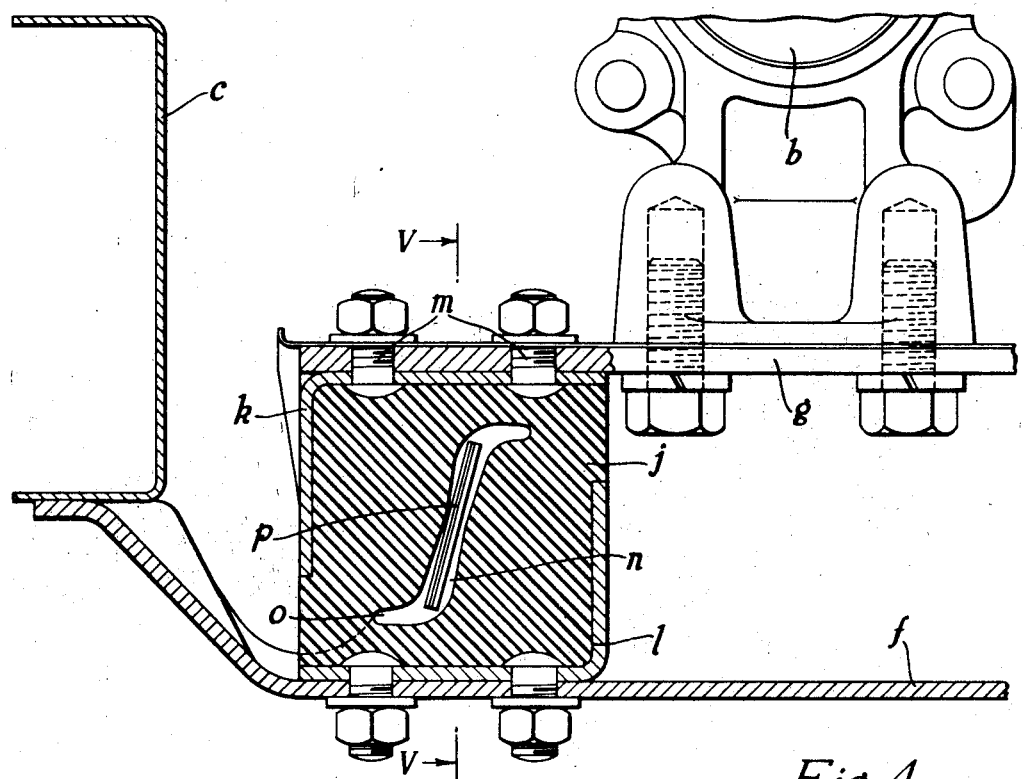
Figure 4 is a transverse section on an enlarged scale, on the line IV—IV of Figure 1, of one of the rear units.
Figure 5:
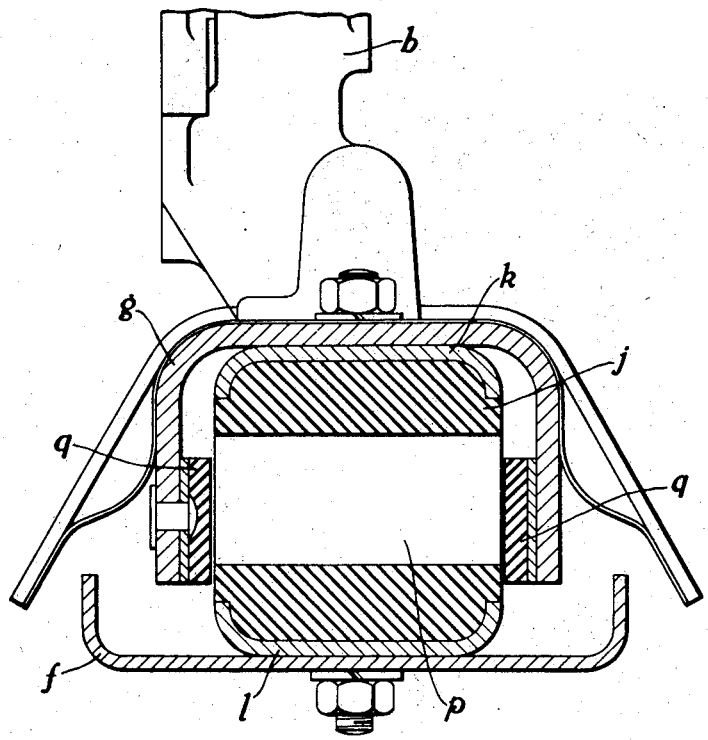
Figure 5 is a longitudinal section of a rear unit, taken on the line V—V of Figure 4.

The front units as shown in Figures 2 and 3 are more widely spaced than the rear units, and they are mounted between brackets $d$ on the side members and extensions of the front cover plate $e$ (Figure 2). The rear units are mounted between a cross member $f$ and a bracket $g$ fastened to the rear of the clutch and gear-box unit $b$ (Figures 4 and 5). Each of the units is of substantially the same form and construction as follows:

The unit comprises a cube of rubber $j$ mounted between a pair of angle plates $k, l$ and attached thereto, as by vulcanization, over their contacting surfaces. The plates $k, l$ are situated at diagonally opposite edges of the block; one plate $k$ covers and is attached to the top surface of the block, and extends also partway down one side; the other plate $l$ covers and is attached to the bottom surface of the block and extends also partway up one side. Part of each side surface of the rubber block is thus exposed. The front and rear edges of the plates $k, l$ are respectively downturned and upturned as shown most clearly in Figure 5, so that they overlap the front and rear surfaces of the block to some extent. These front and rear portions are also vulcanized to the surfaces of the rubber block.

The top and bottom portions of each plate $k, l$ are provided with attachment means such as bolts $m$ or the like by means of which the unit is fastened respectively to the brackets $d$ and plate $e$ for the front members, and bracket $g$ and cross member $f$ for the rear members.

As above indicated the block of rubber is provided with a slot $n$ which controls the flexibility and thus permits the necessary movements, within limits. The slot, as viewed from the front and as shown in Figures 3 and 4, extends in general diagonal direction with its top end towards the center line of the engine. The main channel of the slot has its sides substantially parallel with a slight convergence towards the center, and the ends of this main channel of the slot merge into horizontal outwardly extending pockets $o$, the vertical distance between whose upper and lower walls may be smaller than the distance between the walls of the main channel, although this vertical distance is varied to suit engine characteristics. For example, the greater the inertia forces of the reciprocating parts, the more initial "freedom" is required by the engines and thus a greater vertical distance between the walls of the pockets $o$ is required. Thus it will be seen that the whole slot is what may be termed of an open elongated S shape. The general shape is akin to a hysteresis loop.

The torque reaction oscillation of the engine unit ab is permitted owing to the high initial flexibility or freedom of movement of the units, due to the presence of the slots n: the amplitude of oscillation is normally less than the width of the slot. Should this be exceeded, then the sides of the slot contact and further movement is resisted by a low flexibility. If desired the torque resistance characteristic may be designed by inserting in the main channel of the slot an insert piece of fibre or the like p (Figure 4) whose thickness will cause an increased resistance, or lower flexibility, at the desired range of amplitude. This insert is retained in the slot by pads q (Figure 5) attached to the downturned ends of bracket g.

Oscillation about the vertical axis passing through the center of gravity of the engine unit, due to dynamic out of balance, is permitted within limits by the shear action between the upper and lower angle plates k, l. The degree of resistance is determined by the exposed side areas of the rubber block, and the distance between these and the ends of the adjacent pockets o. The determination of this resistance is effected according to the location of the center of gravity. The mean distance from the front units to the center of gravity multiplied by a factor representing front flexibility should be approximately equal to the distance from rear mounting unit to the center of gravity multiplied by a factor representing the flexibility of the rear mounting. This relation preserves the center of gravity in the axis of rotation, for this particular movement.

Vertical oscillations of the front end of the unit will be permitted by virtue of the vertical distance between the horizontal walls of the outwardly extending pockets o. The distance between the side and end portions of the angle plates k, l is also a factor which determines the resistance characteristic of the unit for this type of oscillation.

It will be seen from the above that a mounting unit according to this invention is in effect a universal mounting which permits oscillations of various kinds, within limits. Furthermore, it overcomes one of the serious disadvantages of torque reaction; that is, the resonance between the impressed engine vibrations and the natural frequency of the engine unit, and the consequent building up of large amplitudes of vibration. It is desirable that the natural frequency of the mounting unit should be below the working range of engine vibrations, but this normally is not easily obtainable. By means of a unit according to this invention the resistance is increased, that is the flexibility is lowered, for amplitudes above a certain value, and hence the natural frequency is raised. For example, suppose the normal, small-amplitude flexibility gives a resonance when a four-cylinder engine is driving the car in a certain gear at seven miles per hour. The amplitude will build up, but this will increase the resistance and hence will automatically raise the natural frequency of the unit, for example, to one corresponding to 15 miles per hour, and thus take it out of the existing range of engine impulses. As the speed, and hence the frequency of engine impulses increases, the amplitude falls and at say 15 miles per hour the natural frequency has fallen to that corresponding say to seven miles per hour, and thus there is no resonance. Thus resonance is in effect eliminated; the invention may be considered as providing a mounting unit having a resistance to movement which varies inversely with the frequency of engine torque impulses.

In a modification two side units, located in the transverse center-of-gravity plane are arranged to carry most of the weight of the engine and for this purpose the blocks of rubber are lengthened so as to be rectangular instead of square in cross section. Then at the front and rear two square units are arranged centrally.

If desired there may be added to the arrangement above described and shown in the drawings, a cross member in the space between the engine a and clutch and gear-box unit b, and carrying a supplementary block of rubber attached at the top to the casing of the unit. This block will carry some of the weight and will tend to restrain transverse oscillations.

Units according to the invention may be used in conjunction with other types if desired. For example, the rear end of an internal combustion engine may be mounted by means of a flat block or ring or segment of rubber.

It is to be understood that units according to the invention may be located wherever practicable on the engine or the like.

I claim as my invention:

1. A mounting unit for internal combustion engines and the like comprising a block of rubber or like resilient material mounted between diagonally opposite angle plates and having a slot therein extending transversely to the diagonal relation of the plates to provide variable resistance to relative movement between said plates.

2. A variable rate cushion mounting unit for internal combustion engines and the like comprising a block of rubber or like resilient material mounted between and attached to diagonally opposite angle plates and having a diagonal slot of ogee shape therein to accommodate deflection of the block within the limits of the slot before increased resistance is offered to relative movement between said plates.

3. A mounting unit according to claim 1 in which the slot has at its ends pockets extending substantially horizontally in opposite directions.

4. A mounting unit for internal combustion engines and the like comprising a block of rubber or like resilient material mounted between and attached to angle plates and having a slot therein to allow limited relative movement between said plates and an insert of fibre or the like in the slot.

5. An engine mounting comprising a plurality of units according to claim 1, the slots of the units being inclined inwardly and upwardly towards the axis of engine oscillation under torque reaction.

6. A vibration damping support having relatively low resistance within and relatively high resistance beyond a predetermined amplitude range and comprising a pair of diagonally related opposed angle plates, a block of rubber having its diagonally opposite corners and adjacent side faces fitted to said angle plates and a slot in said block serving generally to divide the same into a pair of weight supporting pillars, each backed on its outer face by an angle plate and adapted after the clearance in the slot is taken up by pillar deflection to abut through its inner face on the adjacent pillar for increased resistance to further deflection, said slot extending generally in a plane transverse to a line connecting said diagonally related corners and being of a width substantially corresponding to the amplitude of movement selected to meet low resistance.

7. A vibration damping support having a variable rate of resistance to relative movement and comprising a block of rubber having a substantially S shaped opening therein with its opposite ends in a plane transverse to the direction of certain vibrations and its intermediate portion transverse to the direction of other vibrations, and a pair of deflection confining elements engaging diagonally related portions of the rubber block.

ALEX TAUB.